United States Patent [19]

Steck, III

[11] 3,897,158

[45] July 29, 1975

[54] SIGHTING DEVICE

[75] Inventor: William F. Steck, III, El Paso, Tex.

[73] Assignee: W. R. Weaver Company, El Paso, Tex.

[22] Filed: June 11, 1971

[21] Appl. No.: 152,337

Related U.S. Application Data

[63] Continuation-in-part of Ser. No. 34,665, May 5, 1970, Pat. No. 3,645,635.

[52] U.S. Cl. .................................................. 356/251
[51] Int. Cl.² .......................................... G02B 23/10
[58] Field of Search ..................... 356/251, 253, 255

[56] References Cited
UNITED STATES PATENTS

| | | | |
|---|---|---|---|
| 2,780,130 | 2/1957 | Mauer | 356/251 |
| 3,524,710 | 8/1970 | Rickert | 356/251 |

*Primary Examiner*—Ronald L. Wibert
*Assistant Examiner*—Conrad J. Clark
*Attorney, Agent, or Firm*—Donald R Motsko; William W. Jones

[57] ABSTRACT

A sighting device for use, for example, with a shotgun, the device employing a reticle of fluorescent acrylic polymer disposed out of the field of view. The image of the reticle is projected into the field of view by a preferably dichroic partial reflector. Windage and elevation adjustments are included for moving the reticle to zero in the device on the target in the field of view. The image of the reticle is collimated so as to appear in focus with the target to the eye of the observer.

6 Claims, 9 Drawing Figures

PATENTED JUL 29 1975 3,897,158

SHEET 1

WILLIAM F. STECK III
INVENTOR

BY William W. Jones
ATTORNEY

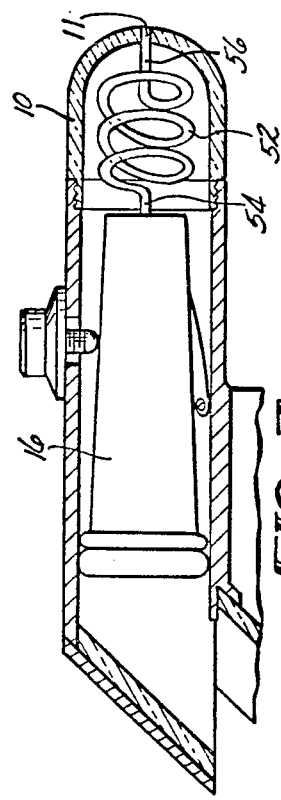
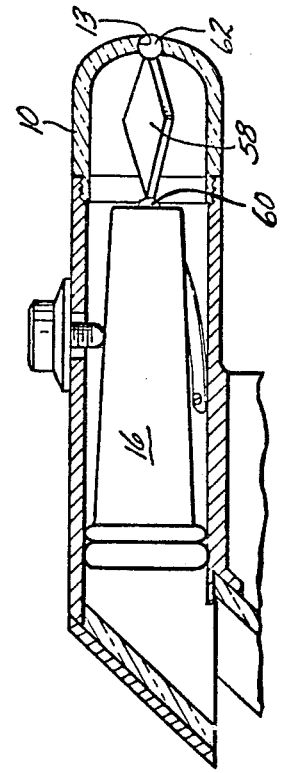
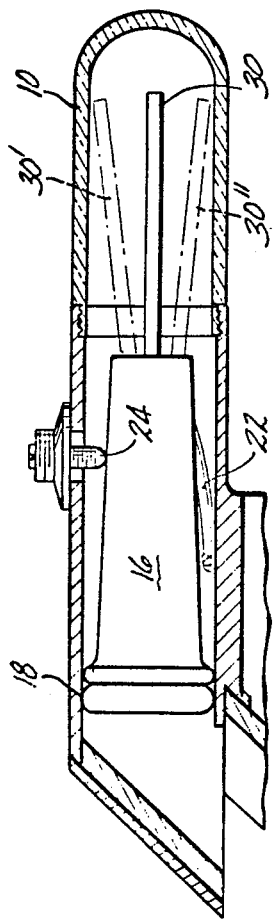
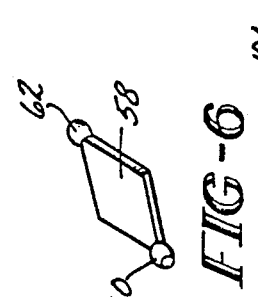
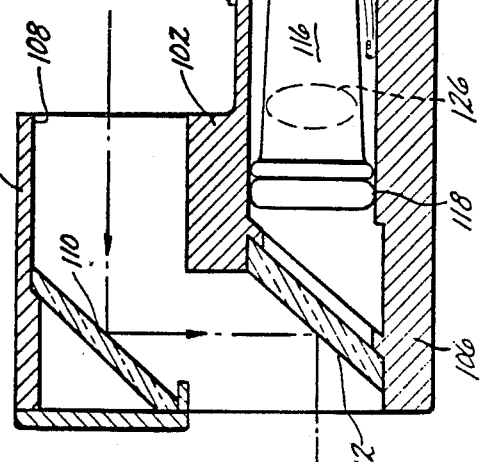

SIGHTING DEVICE

This is a continuation-in-part of my co-pending application Ser. No. 34,665 filed May 5, 1970 now 3,645,635.

This invention broadly concerns a sighting device particularly adapted for use with firearms, such as shotguns, or the like.

The use of collimating sighting devices having a reticle which is projected into a field of view by reflecting means is broadly known, and one such sight is disclosed in U.S. Pat. No. 2,633,051 to Clinton S. Davis. Another such device is disclosed in U.S. Pat. No. 2,472,809 to John R. Decker. A problem which manifests itself in sighting devices of this type concerns the brightness of the image of the reticle which is superimposed onto the field of view. In order that the sight have maximum utility under all ambient daylight brightness from dawn to dusk, the image of the reticle must be as brilliant as possible. U.S. Pat. No. 2,472,809 seeks to solve the problem of the brightness of the reticle by providing an internal illuminator for use with the reticle and by providing means for varying the intensity of the illuminator. This solution is expensive and therefor undesirable for use in low to moderately priced sighting devices. This solution also requires the use of two reticles, one for use in bright ambient light, and another for use in dim ambient light.

It is further noted that a number of the prior art collimating-type sights require the operator to use both eyes, one eye views the target and the other eye views the reticle, with the eyes combining to superimpose the two views onto each other so that the reticle appears, to the operator, to be on target. This latter type of sight has proven very efficient for those who are able to coordinate their two eyes sufficiently to use it, however, it has been found that the great majority of shooters are unable to achieve such coordination and thus cannot use the sight.

The sighting device of this invention solves the problem concerning the brightness of the reticle by using a reticle constructed of a fluorescent material, such as a fluorescent colored acrylic polymer which is exposed to ambient light. The material from which the reticle is made is chosen for its light piping characteristics as well as its ability to receive the light through its side walls and pipe the received light to its end walls. The size and shape of the reticle is chosen so that the reticle has a substantially greater side wall area through which light is received, as compared to the end, or edge wall area through which light is projected. Thus the light is received throughout a relatively large sidewall area and piped out through a relatively small end wall area so that the end wall portion appears substantially brighter than the side wall area. The reticle is preferably in the form of a rod or sheet. If a rod, the reticle-illuminator member must have a diameter of less than about 0.200 inch in order to obtain the required brightness of the reticle image, and the diameter of the reticle-illuminator rod is preferably in the range of about 0.020 inch to about 0.150 inch. If the reticle-illuminator member is a sheet, the thickness of the sheet must be within the limits set forth above for the diameter of the reticle rod. The reticle is made of a fluorescent colored material which emits a colored light beam in a preselected narrow wave length band of the spectrum, the most preferred material being one which emits an orange light, which is easiest for the eye to see.

The reticle is mounted so that its side wall portion is fully exposed to ambient light which is thus received into the reticle body. The other end wall portion may extend into a darkened chamber and thus appears as a bright spot within the darkened chamber. A mirror is positioned in the device so as to reflect the light from the reticle through approximately a 90° angle toward a partially reflective mirror which is preferably coated with a dichroic reflective coating chosen to reflect only the particular wavelength of light emerging from the reticle, the partial reflector thus acting as a dichroic beam-splitter. The dichroic coating permits substantially all other wavelengths of light to pass through the partially reflective mirror without being reflected. The dichroic beam splitter can be formed to reflect a first given narrow band of colored light and transmit a second given narrow band of colored light, with an almost infinite number of combinations of reflected and transmitted colors being possible. The dichroic reflector is positioned in a housing defining the field of view and reflects the image of the reticle toward the operator's eye. The light from the target is permitted to pass through the partial reflector substantially unobstructed, so that the operator sees the field of view including the target, with the image of the reticle superimposed thereover. A collimating lens is interposed between the reticle and the dichroic beam splitter so as to transmit the rays comprising the image of the reticle along parallel paths to the beam splitter. This permits the operator to move his head when using the device without causing the reticle image to leave the target as seen in the field of view, and projects the image of the reticle to infinity so as to appear to be on the target.

The darkened chamber is preferably in the form of a tube which is pivotally mounted in the sight housing. Windage and elevation turrets are mounted on the housing and are operative to pivot the tube against the bias of a spring so as to move the reticle image and thereby correct for windage and elevation errors in the projectile trajectory to zero in the sight on the target.

It is therefore an object of this invention to provide a sighting device having a reticle of fluorescent acrylic polymer material which is disposed outside of the field of view and the image of which is projected into the field of view.

It is the further object of this invention to provide a sight of the character described wherein a partial reflector is used to superimpose the image of the reticle over the field of view.

It is yet another object of this invention to provide a sighting device of the character described wherein the partial reflector includes a dichroic coating providing high reflectance of the wavelength or color of light from the reticle and high transmission of another preselected wavelength or color of light forming the background for the reticle image.

It is a still further object of this invention to provide a sighting device of the character described wherein the reticle is a body having a longitudinal dimension which is substantially greater than its thickness.

These and other objects and advantages of this invention will become more readily apparent from the following detailed description of several preferred embodiments when read in conjunction with the accompanying drawings in which:

FIG. 4 is a vertical sectional view of a portion of the device of FIG. 2 showing how the windage and elevations adjustments are accomplished;

FIG. 5 is a perspective view of a helical configuration of a reticle body for use with the device;

FIG. 6 is a perspective view of a planar configuration of a reticle body for use with the device;

FIG. 7 is a vertical sectional view of a portion of the sighting device showing the reticle of FIG. 5 mounted therein;

FIG. 8 is a vertical sectional view of a portion of the sighting device showing the reticle of FIG. 6 mounted therein; and FIG. 9 is a vertical sectional view of another embodiment of a sighting device formed in accordance with this invention.

Figure 1:
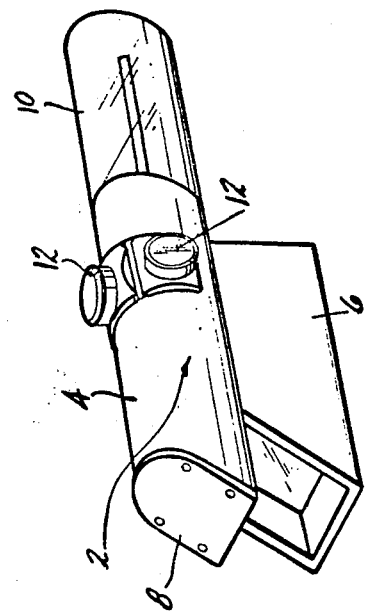
FIG. 1 is a perspective view of a preferred embodiment of the sighting device of this invention.

Referring now to FIG. 1, a preferred embodiment of the sighting device of this invention is shown. The device includes a housing indicated generally by the numeral 2, the housing 2 having an upper portion 4 and a lower portion 6 extending longitudinally of the housing and parallel to each other. Both ends of the lower portion 6 are open, and the rearward end of the upper portion 4 is preferably closed by means of an opaque plate 8. A tubular member 10 of transparent plastic, or glass, is attached to the forward end of the upper portion 4 to project forwardly therefrom, the forward end of the tube 10 preferably being closed. It is noted that the housing 2 can be modified in any known manner to permit mounting on a firearm or other instrument with which it is to be used. A pair of windage and elevation turrets 12 of conventional construction are mounted on the upper portion 4 of the housing, and the operation of the turrets will be set forth in greater detail hereinafter.

Figure 2:
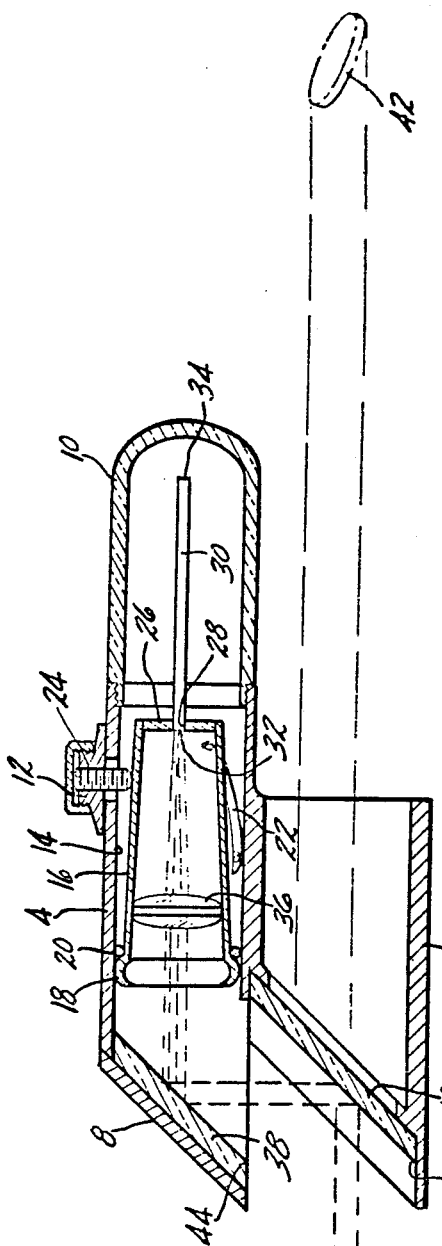
FIG. 2 is a vertical sectional view of the device of FIG. 1 showing the manner in which the reticle image is superimposed onto the image of the target.
Figure 3:
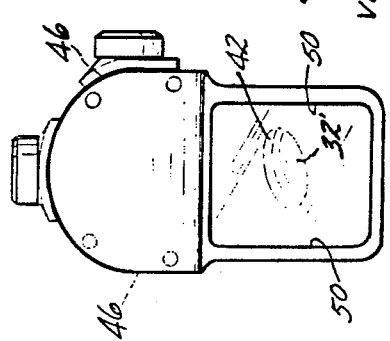
FIG. 3 is an end view of the device of FIG. 2 showing the target and reticle image as they appear to the viewer.

Referring to FIGS. 2 and 3, the upper portion 4 of the housing includes a bore 14 which is preferably circular in cross-section and in which is mounted a tubular member 16. The rearward end of the tubular member 16 is preferably radially enlarged as at 18 to provide a pivoting mount connection for the tube 16. Thus the tube 16 can be pivoted about its rearward end within the bore 14. A rubber ring 20 may be mounted forward of the enlargement 18 in snug engagement with the wall of the bore 14 so that no light can pass rearwardly between the wall of the bore 14 and the enlargement 18. A blade spring member 22 is secured to the wall of the bore 14 and also to the tube 16 at a point forward of the ellargement 18 so as to bias the tube 16 for pivoting movement about the enlargement 18. An adjustment screw 24 is threaded through each of the turrets 12 with the inner end of each screw 24 bearing against the tube 16 at points approximately 90° apart. The spring member 22 is positioned so as to bias the tube 16 against both screws 24.

A disk 26 is positioned in the forward end of the tube 16, the disk 26 having an aperture 28 in the center thereof through which aperture 28 extends a reticle-illuminator body 30 in the form of a rod of colored fluorescent material. The reticle-illuminator body 30 projects forwardly from the disk 26 and into the confines of the transparent tube 10. The reticle 30 is preferably in the form of a solid cylindrical body of acrylic polymer. It is formed by extruding a powdered form of the polymer in a known manner. The polymer includes a dye additive which gives it color, preferably a bright color such as red or orange, and also includes an additive which gives it maximum fluorescence. A further additive is included to give the fluorescence imparted to the polymer maximum permanence. The reticle body includes a longitudinal dimension, a thickness dimension, and a width dimension. When the reticle takes the form of a cylinder as shown in FIG. 2, the thickness and width are equal. I have discovered that the diameter of the reticle body 30, when a rod must be less than about 0.200 inch to provide sufficient brilliance of reticle image, and should preferably be in the range of about 0.020 inch to about .150 inch to provide maximum brilliance of reticle image. Any increase or decrease in rod diameter outside of the ranges disclosed results in an undesirable loss of reticle image brilliance. The longitudinal dimension must be substantially greater than the thickness so as to form a body with a relatively large side wall area as compared to its end wall area. The large side wall area is exposed to ambient light by being positioned within the transparent tube 10. The ambient light then passes through the large side wall area and is piped and internally reflected through the reticle body and out through the end wall of the reticle body disposed within the tube 16. Thus the inner end wall 32 of the reticle 30 appears as a very brightly colored spot within the darkened interior of the tube 16. The fluorescence of the reticle material greatly increases the brightness of the reticle body end wall 32. The disk 26 can be formed from an opaque material which prevents ambient light from entering the tube 16 thus darkening the interior of the tube 16 so that the reticle end wall 32 appears as a brightly colored spot as contrasted to the darkened interior of the tube 16 and and disk 26. Alternatively, the disk 26 can be formed from a transparent colored plastic material which transmits ambient light into the interior of the tube 16 in the form of colored light, the same color as the disk 26. It is noted that the forward end wall 34 of the reticle 30 can be painted with an opaque coating without lowering the brightness of the inner end wall 32. Optimum brightness will be achieved when the rod is longer than about 2 inches, and need be no longer than about 3 inches and the rod diameter is within the limits noted above.

A collimating lens 36 is mounted in the interior of the tube 16 and is operative to magnify and convert the light rays from the reticle body end wall 32 into parallel collimated rays which are then directed against a first side mirror 38 which is mounted on the plate 8. The reflector 38 is preferably a first side mirror to eliminate a double image of the reticle end wall 32 which would otherwise occur at the reflector. While a first side mirror is preferred, other reflecting means, such as prisms or the like could be used without departing from the spirit of the invention.

The light rays from the reticle end wall 32 are reflected by the reflector 38 downwardly onto a partial reflector 40 mounted in the lower portion 6 of the housing 2. The partial reflector 40 is also preferably a first side mirror with a dichroic reflecting coating. The dichroic coating material is selected so as to reflect light rays in the wavelength emitted by the reticle 30, while permitting other light rays to pass through. Thus if the reticle has an orange color, the dichroic coating will be orange-reflecting. The dichroic coatings will reflect up to about 95% of the reticle color while passing greater than 70% of all the remaining colors in the spectrum. If the disk 26 is in the form of a transparent colored plastic body, the dichroic coating can be selected so as to reflect substantially all wavelengths of light corresponding to the color of the reticle end wall 32, while at the same time transmit substantially all of the wavelengths of light corresponding to the color of the disk 26. Thus substantially all of the ambient light passing through the disk 26 into the interior of the tube 16, and thus colored by the disk 26 will be transmitted through the dichroic beam splitter 40 and not be seen by the eye of the observer. Thus the transparent colored disk 26 will be made to appear opaque to the eye of the observer by the dichroic beam splitter. The color reflecting-transmitting capabilities of dichroic coatings can be accurately controlled and predetermined, so that a wide range of color combinations for the reticle body 30 and disk 26 can be used. By way of example, it has been found that a blue disk can be combined with an orange reticle body and projected onto a dichroic coating which will reflect the orange color and transmit the blue color. Since the reflector 40 is a partial reflector, the viewer can see the target 42 (shown in phantom) through the reflector 40 and can at the same time see the image 32' of the end wall 32 of the reticle superimposed over the target 42, as seen in FIG. 3. Thus the operator can use the sighting device of this invention with only one eye open because the device itself superimposes the reticle image and the target one over the other. The collimating lens 36 eliminates parallax between the reticle image 32' and the viewed target 42 so that the operator can move his eye without causing relative movement to occur between the reticle image and target and further projects the reticle image 32' out to infinity and thus in focus with the target 42. The rearwardmost edge 44 of the reflector 38 and the side edges 46 thereof are preferably outwardly spaced from the rearwardmost edge 48 and side edges 50 of the partial reflector 40 so that no halo will appear to the viewer at the edges of the partial reflector 40. Of course, the reflecting surfaces of the reflectors 38 and 40 should preferably be parallel to ensure proper operation.

Referring now to FIG. 4, the mode of operation of the windage and elevation adjustment controls are shown. The spring 22 is circumferentially positioned with respect to the tube 16 so as to bias the latter about the enlargement 18 and against both of the adjustment screws 24 (only one shown.) Thus movement of the screws 24 results in pivotal movement of the tube 16. The diameter of the interior of the transparent tube 10 is substantially larger than the diameter of the reticle 30 so that the reticle can move between the positions 30' and 30'' easily without contacting the transparent tube 10. It will be readily appreciated that movement of the tube 16 will result in a corresponding movement of the reticle image 32' as viewed on the partial reflector 40 with the extent of image movement being predetermined to correspond to a known displacement of the point of impact of the projectile or shot charge at a certain range.

Referring to FIGS. 5 and 6, alternative embodiments of the reticle used with the sighting device of this invention are shown. In FIG. 5, the reticle 52 takes the form of a cylindrical rod which is bent into a helical configuration. This configuration provides a large amount of side wall area for absorbtion of light, while at the same time lessens the overall longitudinal distance between one end of the reticle body and the other end thereof. This embodiment permits shortening of the transparent tube 10 (see FIG. 4) thus changing the external appearance of the device. One end 54 of the reticle 52 is straightened for insertion into the tube 16, and the other end 56 of the reticle 52 is straightened for insertion through an aperture 11 formed in the nose of the tube 10. Since the helical configuration is inherent springy, the windage and elevation adjustments can be easily made inspite of the fact that both ends of the reticle 52 are secured in place.

Another embodiment of the reticle contemplates the use of a planar body 58 having ball-shaped projections 60 and 62 at either end thereof. The planar configuration insures the provision of a large side wall area for absorbtion of light to be piped to the rearward end wall. The planar reticle 58 also permits the length of the transparent tube to be shortened without lowering the light-absorbing ability of the reticle, since the side wall area remains substantial (see FIG. 8). For desirable image brightness, the planar reticle body 58 must have a thickness of not more than about 0.200 inch, and for maximum image brightness, the body thickness should be from about 0.020 inch to about 0.150 inch. The rearward projection 60 is mounted in a spherical aperture (not shown) and the forward projection 62 is mounted in a spherical aperture 13 in the nose of the tube 10. Thus, ball and socket connections are formed at each end of the planar reticle 58 to permit the latter to pivot when the windage and elevation adjustments are made. It is noted that the thickness of the planar sheet 58 is relatively small when compared to the length and width so that the side wall area (where light is absorbed) is large when compared to the end wall area (from whence light is projected). Thus the critical relationship between the side wall (light absorbing) area, which is relatively large when compared to the end wall (light projecting) area, which is relatively small, is maintained so that the end wall area will appear to be substantially brighter than the side wall area.

FIG. 9 discloses an alternative embodiment of the sighting device of this invention This embodiment includes a housing 102 having an upper portion 104 and a lower portion 106 the upper portion 104 is open-ended at 108 to define a field of view. A first-surface mirror 110 is mounted in the upper portion so as to reflect the field of view downwardly onto a first-surface partially reflective mirror 112. The mirrors 110 and 112 are so aligned that the field of view will be reflected back toward the viewers eye. A transparent tube 114 of plastic or glass is mounted on the front end of the lower portion 106 of the housing 102.

A tube 116 is mounted in the lower portion of the housing for pivotal movement about a radial enlargement 118 at its rearward end portion, there being a spring 120 engaging the side wall of the tube 116 to bias the latter against windage and elevation adjustment screws 122 (only one of which is shown). A reticle member 124 in the form of a rod of acrylic polymer having appropriate color and fluorescence is mounted in the front end of the tube 116. In the same way as previously explained, the rearward end wall of the reticle 124 forms a bright spot inside the tube 116 which spot can be seen through the partial mirror 112. A collimating lens 126 is mounted in the tube 116 to collimate the light rays from the end wall of the reticle 124 to the eye of the viewer. Thus the image of the field of view is superimposed over the reticle. The operator can use the device with only one eye open since the device allows him to see both the target and reticle superimposed one over the other.

It is readily apparent that the sighting device of this invention can be used in all daylight conditions ranging from bright sunlight to heavy overcast and will provide a bright reticle which is easily discernable against the target. The brightness of the reticle is achieved by close control of the thickness of the reticle body and without the necessity of providing an internal illuminating device to light the reticle, the reticle being illuminated exclusively by ambient external light, e.g. sunlight. The reticle body itself is formed from acrylic polymer having a dye and fluorescent material incorporated therein, and having a large side wall area exposed to ambient light for absorbing the latter, and a small end wall area through which absorbed light is emitted. Since the end wall area is substantially smaller than the side wall area, the end wall appears much brighter than the side wall area to the eye of the viewer. Thus the reticle body end wall, which forms the aiming point of the device, is always substantially brighter than the target area so as to clearly stand out therefrom.

Since many changes and variations of the disclosed embodiments of the invention may be made without departing from the inventive concept, it is not intended to limit the invention otherwise than as required by the appended claims:

What is claimed is:

1. A sighting device comprising:
    a. reticle means operative to convert ambient light into a first colored light of a first predetermined relatively narrow wavelength range, said reticle means having an end wall which is illuminated by said first colored light to provide a colored aiming point for said device;
    b. transparent means operative to transmit and convert ambient light into a second colored light of a second predetermined relatively narrow wavelength range different from said first wavelength range, said transparent means being arranged to provide a background of said second colored light by which said end wall having said first colored light is surrounded;
    c. means providing a field of view in which a target can be sighted;
    d. collimating means operative to collimate an image of said aiming point; and
    e. image deflecting means including dichroic beam splitter means, said image deflecting means being operative to deflect said image of said aiming point into said field of view, and said dichroic beam splitter means being operative to reflect colored light in said first wavelength range toward a viewer's eye and transmit colored light in said second wavelength range away from a viewer's eye whereby said aiming point appears to a viewer looking at the field of view through said beam splitter means as a colored area in said field of view and said background is not seen by the viewer in said field of view.

2. The sighting device of claim 1, wherein said reticle means is fluorescent.

3. The sighting device of claim 2, wherein said reticle means is a cylindrical rod.

4. The sighting device of claim 3, wherein said rod has a diameter of less than about 0.200 inch.

5. The sighting device of claim 3, wherein said rod has a diameter in the range of about 0.020 inch to about 0.120 inch.

6. A sighting device comprising:
    a. fluorescent means operative to convert ambient light into colored fluorescent light, said fluorescent means having an end wall which is illuminated by said fluorescent light to provide a fluorescently colored aiming point for said device, said fluorescent means having a thickness dimension forming at least one dimension of said end wall, which thickness dimension is less than about 0.200 inch;
    b. means on said device providing a field of view in which a target can be sighted;
    c. reflecting means operative to superimpose an image of said aiming point over said field of view, said reflecting means comprising at least one dichroic beam splitter means operative to reflect substantially all light in the wavelength range corresponding to the color of said aiming point, and transmit substantially all light of a color corresponding to another preselected wavelength range;
    d. collimating means interposed between said fluorescent means end wall and at least a part of said reflecting means to collimate said aiming point image; and
    e. transparent means operative to transmit and convert ambient light into colored light corresponding to said other preselected wavelength range, said transparent means being arranged to provide a background of colored light of said other preselected wavelength range surrounding said colored aiming point, said dichroic beam splitter means transmitting substantially all of the light transmitted by said transparent means whereby said transparent means is not seen by a viewer in said beam splitter means.

* * * * *